(12) United States Patent
Wang et al.

(10) Patent No.: US 11,796,748 B2
(45) Date of Patent: Oct. 24, 2023

(54) ULTRA-THIN BOARD-TO-BOARD PHOTOELECTRIC CONVERSION DEVICE

(71) Applicant: HANGZHOU MO-LINK TECHNOLOGY CO. LTD, Hangzhou (CN)

(72) Inventors: Hao Wang, Hangzhou (CN); Qi Chen, Hangzhou (CN); Hai Tang Qin, Hangzhou (CN); Cheng Zhi Mo, Hangzhou (CN)

(73) Assignee: HANGZHOU MO-LINK TECHNOLOGY CO. LTD, Hangzhou (CN)

( * ) Notice: Subject to any disclaimer, the term of this patent is extended or adjusted under 35 U.S.C. 154(b) by 34 days.

(21) Appl. No.: 17/705,332

(22) Filed: Mar. 27, 2022

(65) Prior Publication Data

US 2022/0357531 A1 Nov. 10, 2022

(30) Foreign Application Priority Data

May 10, 2021 (CN) .......................... 202110506450.8

(51) Int. Cl.
*G02B 6/42* (2006.01)
(52) U.S. Cl.
CPC ......... *G02B 6/4206* (2013.01); *G02B 6/4243* (2013.01)

(58) Field of Classification Search
None
See application file for complete search history.

(56) References Cited

U.S. PATENT DOCUMENTS

| | | | | |
|---|---|---|---|---|
| 11,067,763 B2* | 7/2021 | Wang | ..................... | H05K 1/144 |
| 2003/0159280 A1* | 8/2003 | Young | ................... | G02B 6/4201 |
| | | | | 29/762 |
| 2012/0063718 A1* | 3/2012 | Steijer | ................... | G02B 6/4269 |
| | | | | 385/14 |
| 2013/0279860 A1* | 10/2013 | Hung | ....................... | G02B 6/43 |
| | | | | 385/89 |
| 2021/0084754 A1* | 3/2021 | Wang | ..................... | H05K 1/141 |

* cited by examiner

*Primary Examiner* — Jerry Rahll
(74) *Attorney, Agent, or Firm* — Li & Cai Intellectual Property (USA) Office

(57) ABSTRACT

An ultra-thin board-to-board photoelectric conversion device includes: a plug arranged at one end of an optical fiber; a socket on which the plug is arranged; a retaining element arranged to retain the plug in the socket; and a first circuit substrate on which the socket is mounted. The plug includes: a second circuit substrate; and a photoelectric chip, a lens for transmitting and processing light beams between the optical fiber and the photoelectric chip and a gold finger arranged on the second circuit substrate. The socket includes: a socket main body; and a hollow part for accommodating the lens and the photoelectric chip, an elastic sheet electrode extending from top of the socket main body to bottom of the socket main body and a casing arranged on the socket main body extending from an outer circumference of the socket main body to the top of the socket main body.

12 Claims, 6 Drawing Sheets

ULTRA-THIN BOARD-TO-BOARD PHOTOELECTRIC CONVERSION DEVICE

FIELD OF THE DISCLOSURE

The present disclosure relates to the technical field of computer data transmission technology, in particular, to an ultra-thin board-to-board photoelectric conversion device.

BACKGROUND OF THE DISCLOSURE

In the field of computer data transmission technology, notebook computers, motherboards, memory and hard disks, graphics cards, monitors, data acquisition equipment and various peripherals and other units, for example, are designed with data transmission to achieve functions such as video display, data acquisition, file transmission, etc.

Especially for thin and light notebooks, the display, camera and host computer are connected through a hinge, and the display can be rotated, and the rotation angle can reach 360°. Further, the market has higher and higher requirements for thin and light notebooks in terms of volume, thickness, weight and performance. Obviously, the design of data transmission between devices such as monitors or cameras and the host computer affects the appearance and weight of thin and light notebooks.

In view of this, the present invention proposes an ultra-thin board-to-board photoelectric conversion device.

SUMMARY OF THE DISCLOSURE

The purpose of the present disclosure is to provide an ultra-thin board-to-board photoelectric conversion device.

In order to achieve the aforementioned purpose, the technical solution adopted by the present disclosure is as follows.

An ultra-thin board-to-board photoelectric conversion device is provided, including: a plug arranged at one end of an optical fiber; a socket on which the plug is arranged; a retaining element arranged to retain the plug in the socket; and a first circuit substrate on which the socket is mounted; wherein the plug includes: a second circuit substrate; and a photoelectric chip, a lens and a gold finger arranged on the second circuit substrate, wherein the lens is configured to transmit and process light beams between the optical fiber and the photoelectric chip; wherein the socket includes: a socket main body; and a hollow part, an elastic sheet electrode and a casing arranged on the socket main body, wherein the hollow part is used for accommodating the lens and the photoelectric chip, the elastic sheet electrode extends from a top of the socket main body to a bottom of the socket main body, and the casing extends from an outer circumference of the socket main body to the top of the socket main body, for aligning the gold finger with the elastic sheet electrode.

Preferably, the retaining element is further configured to apply a pressure to the plug, so that the gold finger is retained in effective contact with the elastic sheet electrode, and the elastic sheet electrode is retained in a state in which the gold finger is crimped.

Preferably, the retaining element is further arranged to be thermally and conductively connected to the plug and the socket for expanding a heat dissipation area of the plug, and the retaining element is a metal plate.

Preferably, the metal plate includes: a metal plate body matching a top of the socket; two protruding buckles respectively provided on two opposite edges of the metal plate body and used for snap-fitting with the buckles on the socket; and two lugs respectively provided on another two opposite edges of the metal plate body and used for coupling with the first circuit substrate.

Preferably, a mounting cavity matched with the second circuit substrate and a mounting groove matched with the optical fiber are provided on the casing of the socket on a top of the socket main body, wherein when the second circuit substrate is embedded in the mounting cavity, the gold finger is electrically connected to the elastic sheet electrode correspondingly, and the photoelectric chip and the lens are accommodated in the hollow part, and the optical fiber is accommodated in the mounting groove.

Preferably, the hollow part is rectangular, the elastic sheet electrode is arranged on an edge of the hollow part, and the elastic sheet electrode deforms toward the hollow part after being pressed.

Preferably, the socket is welded to the first circuit substrate through the elastic sheet electrode, and the casing of the socket is welded to the first circuit substrate, so that the socket is mounted on the first circuit substrate and electrically connected thereto.

Preferably, the photoelectric chip includes at least one photoelectric conversion chip, the plug further includes at least one driving chip, the at least one photoelectric conversion chip is arranged in a line on the second circuit substrate, and the at least one driving chip is arranged on the second circuit substrate in parallel with the at least one photoelectric conversion chip.

Preferably, the photoelectric chip includes at least one laser.

Preferably, a thickness of a combined body of the plug, the socket and the retaining element is not more than 1.5 mm.

Preferably, the photoelectric chip and the driving chip are correspondingly fixedly bonded to the second circuit substrate, the photoelectric chip is electrically connected to the driving chip, and the driving chip is electrically connected to the gold finger.

Preferably, the lens is bonded to the second circuit substrate and aligned with the photoelectric chip, the lens includes a plate-shaped lens body, and an accommodating groove arranged on the lens body for accommodating an optical fiber bracket, two side walls of the accommodating groove are provided with positioning protrusions, sides of the optical fiber bracket are provided with positioning grooves, the optical fiber bracket is embedded in the accommodating groove, the positioning groove on the side of the optical fiber bracket cooperates with the positioning protrusion on a side wall of the accommodating groove, so that the optical fiber bracket is aligned with and fixed on the lens body, so as to align and fix the optical fiber to the lens body.

Compared with the prior art, the present disclosure at least has the following beneficial effects.

The ultra-thin board-to-board photoelectric conversion device uses optical fiber to transmit signals, and has the characteristics of long transmission distance, light weight and small wire diameter. Moreover, its thickness is very thin, which can be less than 1.5 mm or thinner and can well meet the thickness requirements of thin and light notebooks.

Figure 1:
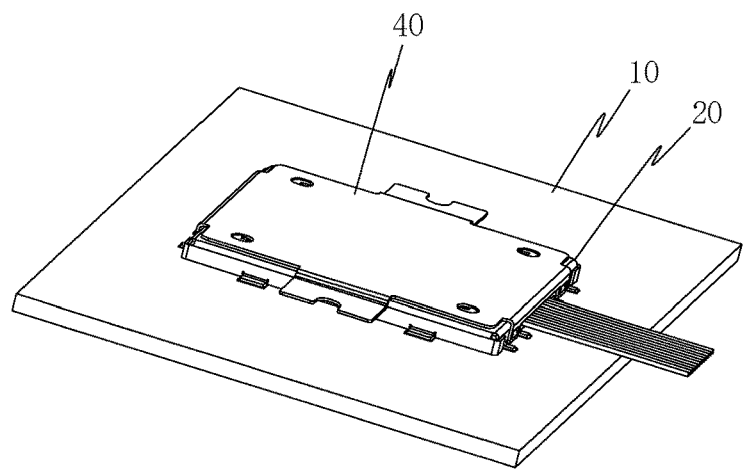
FIG. 1 is a schematic structural diagram of the ultra-thin board-to-board photoelectric conversion device.

Reference numeral: 10. first circuit substrate; 20. socket; 21. socket main body; 22. elastic sheet electrode; 23. casing; 24. hollow part; 25. mounting cavity; 26. mounting groove; 27. buckle; 30. plug; 31. optical fiber; 32. bracket; 321. positioning groove; 33. lens; 331. accommodating groove; 332. positioning protrusion; 34. gold finger; 35. second circuit substrate; 40. retaining element; 41. metal plate body; 42. protruding buckle; 43. lug.

DETAILED DESCRIPTION OF THE EXEMPLARY EMBODIMENTS

The present disclosure will be further described below with reference to the accompanying drawings and embodiments.

Figure 2:
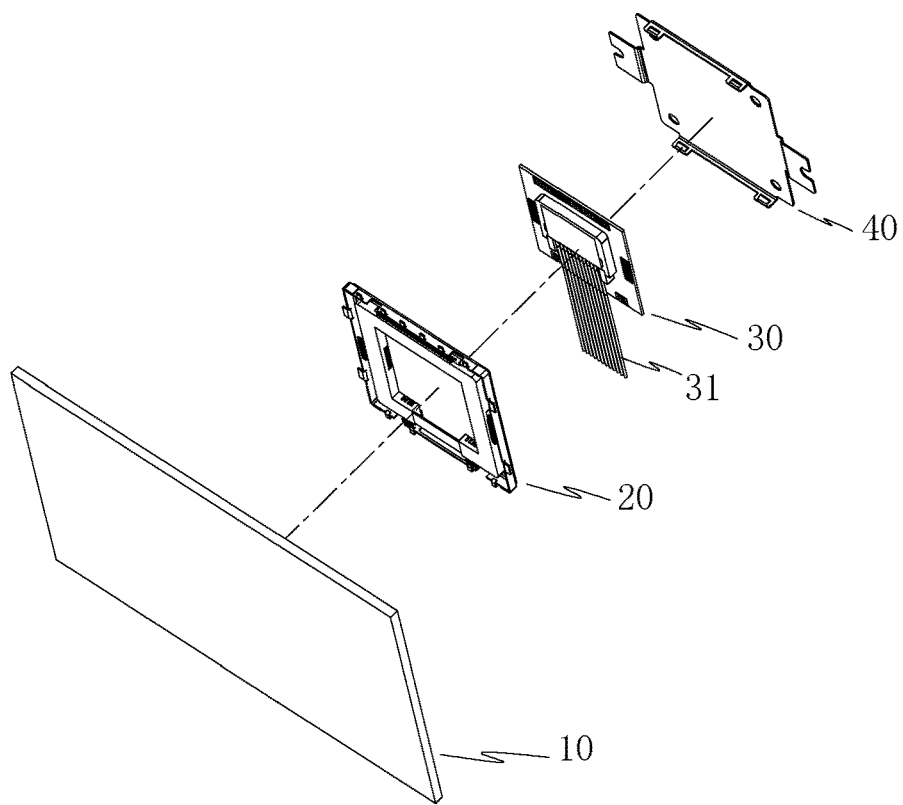
FIG. 2 is an exploded view of FIG. 1.

Reference is made to FIG. 1 and FIG. 2. An ultra-thin board-to-board photoelectric conversion device of the present disclosure includes: a plug 30 arranged at one end of an optical fiber 31; a socket 20 on which the plug 30 is arranged; a retaining element 40 arranged to retain the plug 30 in the socket 20; and a first circuit substrate 10 on which the socket 20 is mounted.

Figure 3:
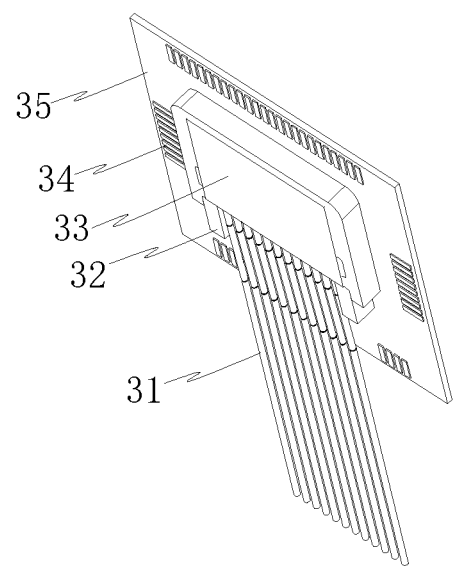
FIG. 3 is the schematic diagram of the downward looking state of the plug.
Figure 4:
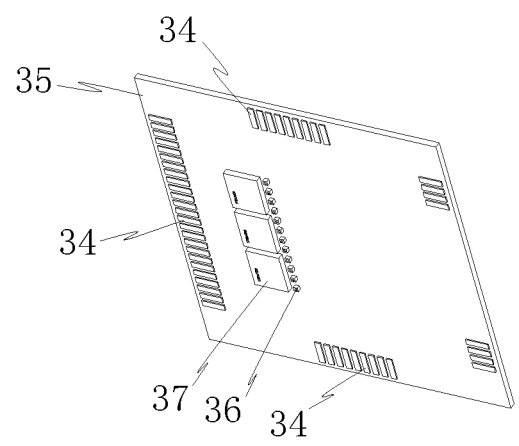
FIG. 4 is a schematic structural diagram of the second circuit substrate.
Figure 5:
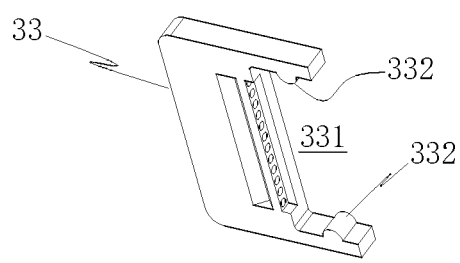
FIG. 5 is schematic structural diagram of the lens.
Figure 6:
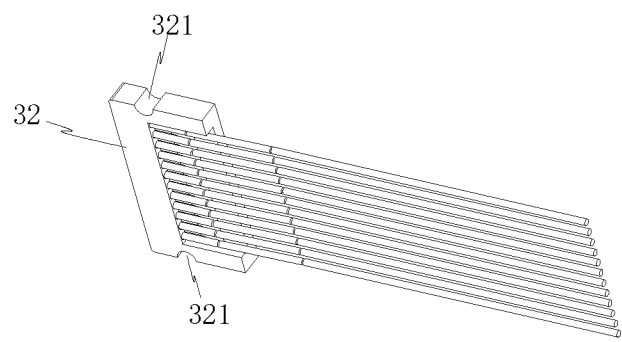
FIG. 6 is schematic structural diagram of the optical fiber bracket.

Reference is made to FIG. 3 and FIG. 4. The plug 30 includes: a second circuit substrate 35, and a photoelectric chip 36, a lens 33 and a gold finger 34 arranged on the second circuit substrate 35, wherein the lens 33 is configured to transmit and process light beams between the optical fiber 31 and the photoelectric chip 36.

The photoelectric chip 36 includes a plurality of photoelectric conversion chips. The photoelectric conversion chips are glued and fixed on the second circuit substrate 35 and arranged in a row. The second circuit substrate 35 is also glued and fixed with a plurality of driving chips 37. The driving chips 37 are arranged on the second circuit substrate 35 in parallel with the at least one photoelectric conversion chip. The gold finger 34 is distributed at four edges of the second circuit substrate 35. The photoelectric chip 36 is electrically connected to the driving chip 37, and the driving chip 37 is electrically connected to the gold finger 34.

The lens 33 is bonded to the second circuit substrate 35 and aligned with the photoelectric chip 36. The lens 33 includes a plate-shaped lens body, and an accommodating groove 331 arranged on the lens body for accommodating an optical fiber bracket 32. Two side walls of the accommodating groove 331 are provided with positioning protrusions 332. The optical fiber 31 is fixed on the optical fiber bracket 32, sides of the optical fiber bracket 32 are provided with positioning grooves 321, the optical fiber bracket 32 is embedded in the accommodating groove 331, and the positioning groove 321 on the side of the optical fiber bracket 32 cooperates with the positioning protrusion 332 on a side wall of the accommodating groove 331, so that the optical fiber bracket 32 is aligned with and fixed on the lens body, so as to align and fix the optical fiber 31 to the lens body.

Figure 7:
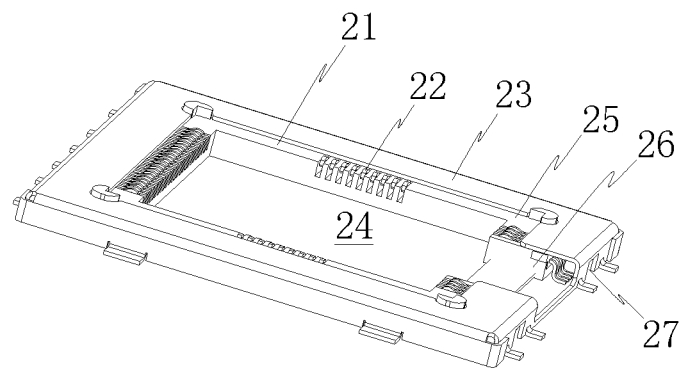
FIG. 7 is a schematic top view of the socket.
Figure 8:
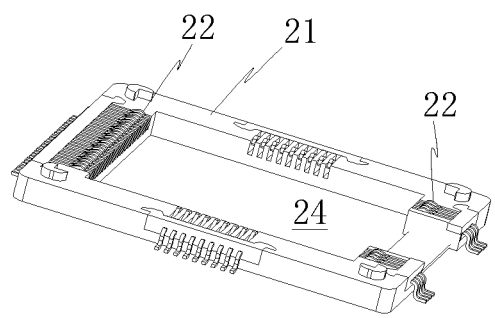
FIG. 8 is a schematic top view of the socket main body.
Figure 9:
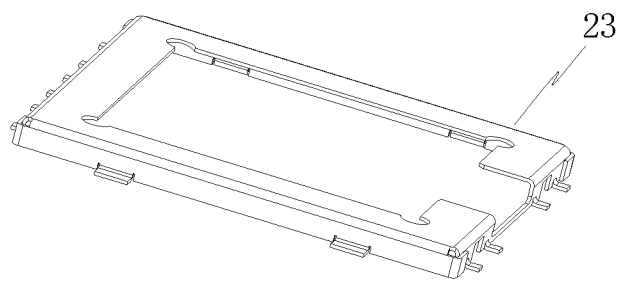
FIG. 9 is the schematic diagram of the casing of the socket.

Reference is made to FIG. 7, FIG. 8 and FIG. 9. The socket 20 includes: a socket main body 21, and a hollow part 24, an elastic sheet electrode 22 and a casing 23 arranged on the socket main body 21, wherein the hollow part 24 is used for accommodating the lens 33 and the photoelectric chip 36, the elastic sheet electrode 22 extends from a top of the socket main body 21 to a bottom of the socket main body 21, and the casing 23 extends from an outer circumference of the socket main body 21 to the top of the socket main body 21, for aligning the gold finger 34 with the elastic sheet electrode 22.

The extension portion of the elastic sheet electrode 22 is welded to the first circuit substrate 10, and the casing 23 is welded to the first circuit substrate 10, thereby fixing the socket 20 on the first circuit substrate 10 and electrically connecting to the first circuit substrate 10.

The hollow part 24 is rectangular in shape, the elastic sheet electrode 22 is disposed on the edge of the hollow part 24, and the elastic sheet electrode 22 can deform toward the hollow part 24 after being pressed.

A mounting cavity 25 matched with the second circuit substrate 35 and a mounting groove 26 matched with the optical fiber 31 are provided on the casing 23 of the socket 20 on a top of the socket main body 21, wherein when the second circuit substrate 35 is embedded in the mounting cavity 25, the gold finger 34 is electrically connected to the elastic sheet electrode 22 correspondingly, and the photoelectric chip 36 and the lens 33 are accommodated in the hollow part 24, and the optical fiber 31 is accommodated in the mounting groove 26.

In addition to retaining the plug 30 in the socket 20, the retaining element 40 is also used to expand the heat dissipation area of the plug 30. For this purpose, the retaining element 40 is a metal plate, and is arranged to be thermally and conductively connected to the plug 30 and the socket 20. In addition, the retaining element 40 is also used for applying a pressure to the plug 30, so that the gold finger 34 is in effective contact with the elastic sheet electrode 22 and the elastic sheet electrode 22 is retained in a state of being pressed against the gold finger 34.

Figure 10:
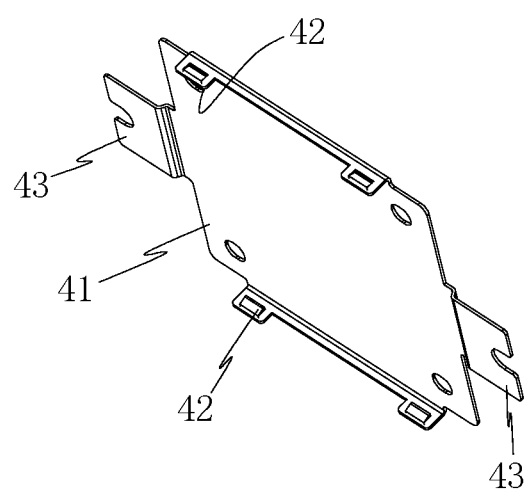
FIG. 10 is a schematic structural diagram of the retaining element.

Reference is made to FIG. 10. The metal plate of the retaining element 40 includes: a metal plate body 41 matching with a top of the socket 20; two protruding buckles 42 respectively provided on two opposite edges of the metal plate body 41 and used for snap-fitting with the buckles 27 (see FIG. 7) on the socket 20; and two lugs 43 respectively provided on another two opposite edges of the metal plate body 41 and used for coupling with the first circuit substrate 10.

Reference is made to FIGS. 1-11. The installation method of the ultra-thin board-to-board photoelectric conversion device is as follows. The plug 30 is inserted from a top of the socket 20, the lens 33 of the plug 30 and the photoelectric chip 36 are embedded in the hollow part 24 of the socket 20, and the second circuit substrate 35 of the plug 30 is embedded in the mounting cavity 25 at the top of the socket 20. At this time, the gold finger 34 of the plug 30 has been aligned with the elastic sheet electrode 22 of the socket 20, and then the retaining element 40 is placed on the plug 30. Then, a downward pressure is applied to snap the protruding buckle 42 of the retaining element 40 into the buckle 27 on the socket 20 to retain the plug 30 on the socket 20. Further, the lug 43 on the retaining element 40 can be coupled with the first circuit substrate 10 to reinforce the combination of the plug 30 and the socket 20 and the combination of the plug 30, the socket 20 and the first circuit substrate 10.

Figure 11:
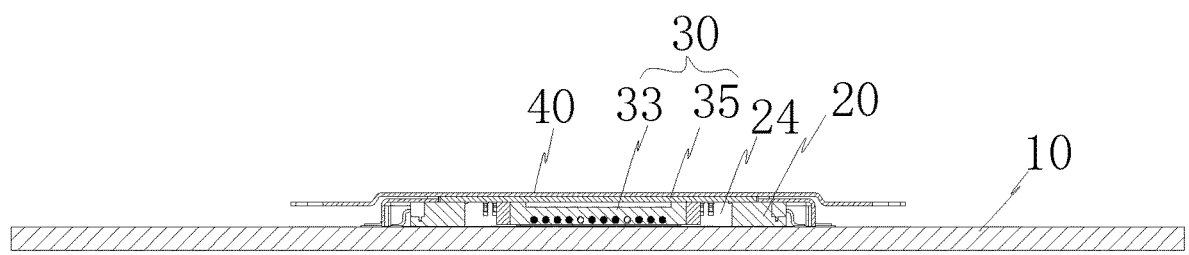
FIG. 11 is a cross-sectional view of the ultra-thin board-to-board photoelectric conversion device.

Reference is made to FIG. 11. In the plugged state of the ultra-thin board-to-board photoelectric conversion device, the lens 33 and the photoelectric chip 36 of the plug 30 are embedded in the hollow part 24 of the socket 20, which does not occupy additional height space and greatly reduces the size of the thickness. Except for the first circuit substrate 10, the thickness of the ultra-thin board-to-board photoelectric conversion device, that is, the thickness of the combined body of the plug 30, the socket 20 and the retaining element 40, is only 1.5 mm, which embodies an ultra-thin package and can well meet the thickness requirements of thin and light notebooks.

The above-mentioned design of the retaining element 40 can quickly replace the photoelectric conversion module (plug 30), which is beneficial to the maintenance and upgrade of the system.

In addition, compared with cable transmission, the ultra-thin board-to-board photoelectric conversion device uses optical fiber 31 to transmit signals, which has the characteristics of long transmission distance, light weight and small wire diameter, can break through the space limitation of the hinge part of the light and thin notebook and embody the data transmission between the host computer and the display part.

The working principle of the ultra-thin board-to-board photoelectric conversion device is as follows. The lens 33 on the second circuit substrate 35 receives the light beam of the optical fiber 31, and the photoelectric conversion chip converts the light beam into an electrical signal. After being processed by the driving chip 37, the signal is transmitted to the signal receiving circuit on the first circuit substrate 10 through the elastic sheet electrode 22 on the socket 20 by the gold finger 34 on the second circuit substrate 35.

As another embodiment, the photoelectric chip 36 on the second circuit substrate 35 of the plug 30 uses a laser. The working principle of the ultra-thin board-to-board photoelectric conversion device is as follows. The signal emitting circuit on the first circuit substrate 10 transmits the electrical signal to the gold finger 34 on the plug 30 through the elastic sheet electrode 22 on the socket 20, and is processed by the driving chip 37. Then, the electrical signal is further transmitted to the laser, then the laser is driven to generate a light beam, and the light beam is introduced into the optical fiber 31 through the lens 33 for transmission.

As a third embodiment, the photoelectric chip 36 on the second circuit substrate 35 of the plug 30 includes a laser and a photoelectric conversion chip, which can receive the light beam from the optical fiber 31, convert it into an electrical signal by the photoelectric conversion chip, and then send it to the first circuit substrate 10. An electrical signal can also be received from the first circuit substrate 10, converted into an optical signal by a laser, and sent to the optical fiber 31.

The present disclosure has been described in detail above through specific embodiments. These detailed descriptions are only intended to help those skilled in the art to understand the content of the present disclosure, and should not be construed as limiting the protection scope of the present disclosure. Various modifications, equivalent transformations, etc. performed by those skilled in the art on the above solutions under the concept of the present disclosure shall be included in the protection scope of the present disclosure.

What is claimed is:

1. An ultra-thin board-to-board photoelectric conversion device, including:
a plug (30) arranged at one end of an optical fiber (31);
a socket (20) on which the plug (30) is arranged;
a retaining element (40) arranged to retain the plug (30) in the socket (20); and
a first circuit substrate (10) on which the socket (20) is mounted;
wherein the plug (30) includes:
a second circuit substrate (35); and
a photoelectric chip (36), a lens (33) and a gold finger (34) arranged on the second circuit substrate (35), wherein the lens (33) is configured to transmit and process light beams between the optical fiber (31) and the photoelectric chip (36);
wherein the socket (20) includes:
a socket main body (21); and
a hollow part (24), an elastic sheet electrode (22) and a casing (23) arranged on the socket main body (21), wherein the hollow part (24) is used for accommodating the lens (33) and the photoelectric chip (36), the elastic sheet electrode (22) extends from a top of the socket main body (21) to a bottom of the socket main body (21), and the casing (23) extends from an outer circumference of the socket main body (21) to the top of the socket main body (21) for aligning the gold finger (34) with the elastic sheet electrode (22).

2. The ultra-thin board-to-board photoelectric conversion device according to claim 1, wherein the retaining element (40) is further configured to apply a pressure to the plug (30), so that the gold finger (34) is retained in effective contact with the elastic sheet electrode (22), and the elastic sheet electrode (22) is retained in a state in which the gold finger (34) is crimped.

3. The ultra-thin board-to-board photoelectric conversion device according to claim 1, wherein the retaining element (40) is further arranged to be thermally and conductively connected to the plug (30) and the socket (20) for expanding a heat dissipation area of the plug (30), and the retaining element (40) is a metal plate.

4. The ultra-thin board-to-board photoelectric conversion device according to claim 3, wherein the metal plate includes:
a metal plate body (41) matching with a top of the socket (20);
two protruding buckles (42) respectively provided on two opposite edges of the metal plate body (41) and used for snap-fitting with the buckles (27) on the socket (20); and
two lugs (43) respectively provided on another two opposite edges of the metal plate body (41) and used for coupling with the first circuit substrate (10).

5. The ultra-thin board-to-board photoelectric conversion device according to claim 1, wherein a mounting cavity (25) matched with the second circuit substrate (35) and a mounting groove (26) matched with the optical fiber (31) are provided on the casing (23) of the socket (20) on a top of the socket main body (21), wherein when the second circuit substrate (35) is embedded in the mounting cavity (25), the gold finger (34) is electrically connected to the elastic sheet electrode (22) correspondingly, and the photoelectric chip (36) and the lens (33) are accommodated in the hollow part (24), and the optical fiber (31) is accommodated in the mounting groove (26).

6. The ultra-thin board-to-board photoelectric conversion device according to claim 1, wherein the hollow part (24) is rectangular, the elastic sheet electrode (22) is arranged on an edge of the hollow part (24), and the elastic sheet electrode (22) deforms toward the hollow part (24) after being pressed.

7. The ultra-thin board-to-board photoelectric conversion device according to claim 1, wherein the socket (20) is welded to the first circuit substrate (10) through the elastic sheet electrode (22), and the casing (23) of the socket (20) is welded to the first circuit substrate (10), so that the socket (20) is mounted on the first circuit substrate (10) and electrically connected thereto.

8. The ultra-thin board-to-board photoelectric conversion device according to claim 1, wherein the photoelectric chip (36) includes at least one photoelectric conversion chip, the plug (30) further includes at least one driving chip (37), the at least one photoelectric conversion chip is arranged in a line on the second circuit substrate (35), and the at least one driving chip (37) is arranged on the second circuit substrate (35) in parallel with the at least one photoelectric conversion chip.

9. The ultra-thin board-to-board photoelectric conversion device according to claim 1, wherein the photoelectric chip (36) includes at least one laser.

10. The ultra-thin board-to-board photoelectric conversion device according to claim 1, wherein a thickness of a combined body of the plug (30), the socket (20) and the retaining element (40) is not more than 1.5 mm.

11. The ultra-thin board-to-board photoelectric conversion device according to claim 8, wherein the photoelectric chip (36) and the driving chip (37) are correspondingly fixedly bonded to the second circuit substrate (35), the photoelectric chip (36) is electrically connected to the driving chip (37), and the driving chip (37) is electrically connected to the gold finger (34).

12. The ultra-thin board-to-board photoelectric conversion device according to claim 1, wherein the lens (33) is bonded to the second circuit substrate (35) and aligned with the photoelectric chip (36), the lens (33) includes a plate-shaped lens body, and an accommodating groove (331) arranged on the lens body for accommodating an optical fiber bracket (32), two side walls of the accommodating groove (331) are provided with positioning protrusions (332), sides of the optical fiber bracket (32) are provided with positioning grooves (321), the optical fiber bracket (32) is embedded in the accommodating groove (331), the positioning groove (321) on the side of the optical fiber bracket (32) cooperates with the positioning protrusion (332) on a side wall of the accommodating groove (331), so that the optical fiber bracket (32) is aligned with and fixed on the lens body, so as to align and fix the optical fiber (31) to the lens body.

* * * * *